United States Patent [19]

Ullman

[11] Patent Number: 5,553,989
[45] Date of Patent: Sep. 10, 1996

[54] TRAILER FOR HAULING VEHICLES

[76] Inventor: James Ullman, Hwy. 77, Wymore, Nebr. 68466

[21] Appl. No.: 370,030

[22] Filed: Jan. 9, 1995

[51] Int. Cl.$^6$ .............................. B60P 1/43; B65G 67/02; E01D 1/00
[52] U.S. Cl. .............. 414/537; 280/789; 410/4; 14/71.1
[58] Field of Search .................... 414/537, 538, 414/480, 571; 410/4, 24; 280/638, 656, 789, 783; 14/71.1; 182/88

[56] References Cited

U.S. PATENT DOCUMENTS

| | | | |
|---|---|---|---|
| 2,705,081 | 3/1955 | Jacobs | 414/537 |
| 3,693,818 | 9/1972 | Teagarden | 414/537 X |
| 4,119,224 | 10/1978 | Moody | 414/537 |
| 4,722,109 | 2/1988 | Mountz | 14/71.1 |
| 5,094,583 | 3/1992 | Bills, Jr. et al. | 414/537 |
| 5,133,634 | 7/1992 | Gingrich et al. | 414/537 |
| 5,256,024 | 10/1993 | Ross | 280/789 X |
| 5,340,267 | 8/1994 | Stoll et al. | 414/537 |

FOREIGN PATENT DOCUMENTS

| | | | |
|---|---|---|---|
| 1038833 | 9/1978 | Canada | 182/88 |
| 2065170 | 10/1992 | Canada | 414/537 |
| 206306 | 12/1986 | European Pat. Off. | 280/789 |
| 2421266 | 11/1979 | France | 182/88 |

*Primary Examiner*—Karen B. Merritt
*Assistant Examiner*—Stephen Gordon
*Attorney, Agent, or Firm*—Zarley, McKee, Thomte, Voorhees & Sease; Mark D. Frederiksen

[57] ABSTRACT

A trailer for hauling vehicles includes a central frame with a pair of longitudinal tubular members and a plurality of transverse tubular cross-members interconnecting the longitudinal members to form an open frame. A pair of ladder frames are affixed along the longitudinal outward faces of the longitudinal members and project transversely therefrom in opposite directions. Each transverse ladder frame includes an outer rail extending parallel to the longitudinal members, and a plurality of rungs connecting the outer rails to the longitudinal members. A pair of tread plates are supposed on the ladder frames and extend from the forward to the rearward end of the frame, the tread plates spaced-apart a distance to support the wheels of a vehicle thereon. A wheel assembly is mounted on the frame to permit transport of the trailer, and a hitch is mounted on the forward end of the frame to permit connection to a pickup or other prime mover. A pair of inner rails are mounted parallel to the ladder frame outer rails, and located inwardly of the longitudinal members. The inner rails and ladder frame outer rails project upwardly beyond the upper surfaces of the rungs of the ladder frames and the upper surfaces of the longitudinal members. The tread plates are preferably journaled between the inner and outer rails and supported on the longitudinal members and rungs. A pair of ramps are provided which are removably connected to the rearward end of the trailer to provide access to the trailer tread plates. A ramp receiving pocket is formed on the trailer to permit storage of the ramps on the trailer.

8 Claims, 4 Drawing Sheets

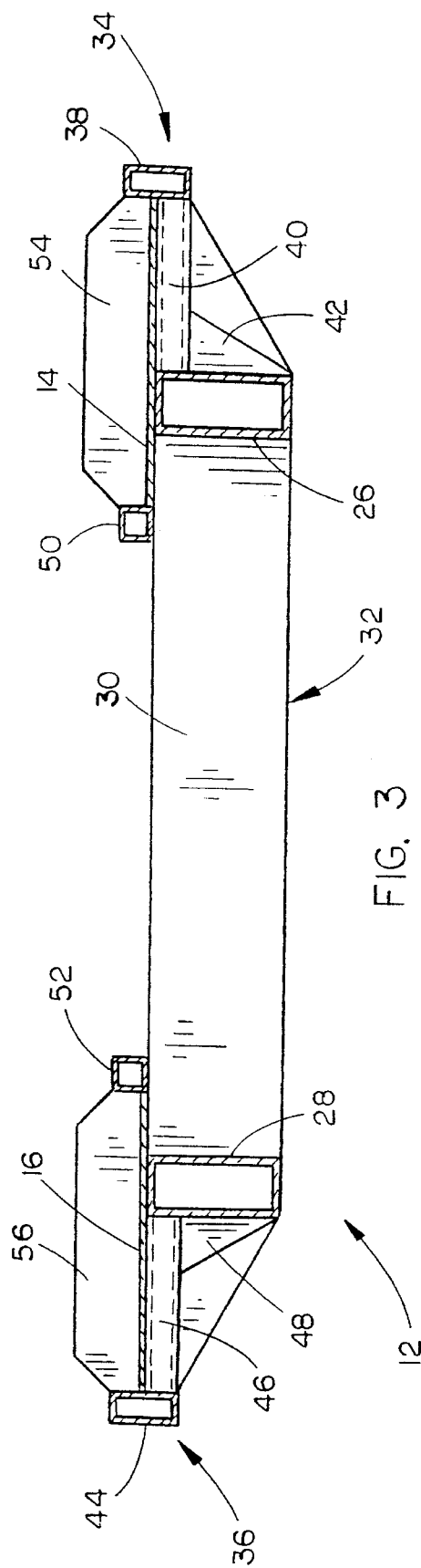
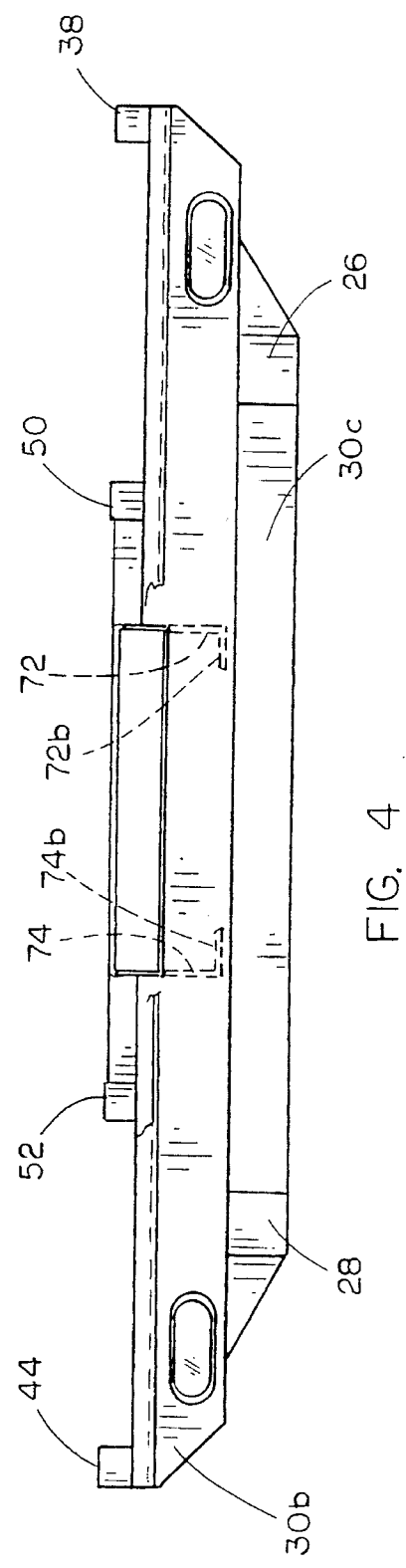
FIG. 3
FIG. 4

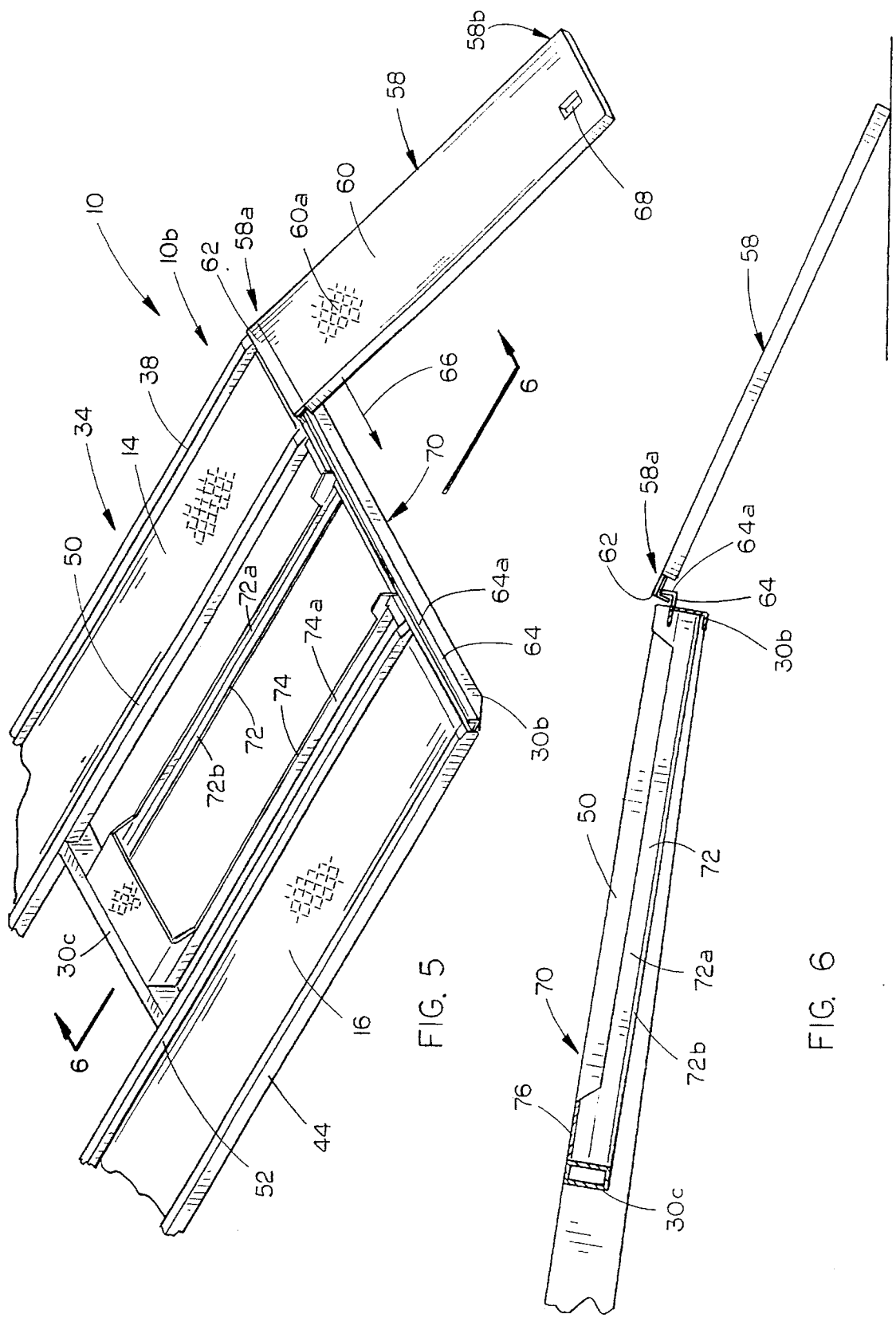

5,553,989

TRAILER FOR HAULING VEHICLES

TECHNICAL FIELD

The present invention relates generally to trailers, and more particularly to an improved trailer for hauling vehicles having a light weight but durable frame.

BACKGROUND OF THE INVENTION

Vehicles for transporting automobiles and trucks have been known for some time. Conventionally, automobiles and the like were transported on multiple levels on semi-tractor trailer trucks, as well as on train cars. However, for smaller loads of two or three vehicles, the use of either trains or semi-tractor trailer trucks is neither economical nor efficient.

SUMMARY OF THE INVENTION

The trailer for hauling vehicles of the present invention includes a central frame with a pair of longitudinal tubular members and a plurality of transverse tubular cross-members interconnecting the longitudinal members to form an open frame. A pair of ladder frames are affixed along the longitudinal outward faces of the longitudinal members and project transversely therefrom in opposite directions. Each transverse ladder frame includes an outer rail extending parallel to the longitudinal members, and a plurality of rungs connecting the outer rails to the longitudinal members. A pair of tread plates are supported on the ladder frames and extend from the forward to the rearward end of the frame, the tread plates spaced-apart a distance to support the wheels of a vehicle thereon. A wheel assembly is mounted on the frame to permit transport of the trailer, and a hitch is mounted on the forward end of the frame to permit connection to a pickup or other prime mover. A pair of inner rails are mounted parallel to the ladder frame outer rails, and located inwardly of the longitudinal members. The inner rails and ladder frame outer rails project upwardly beyond the upper surfaces of the rungs of the ladder frames and the upper surfaces of the longitudinal members. The tread plates are preferably journaled between the inner and outer rails and supported on the longitudinal members and rungs. A pair of ramps are provided which are removably connected to the rearward end of the trailer to provide access to the trailer tread plates. A ramp receiving pocket is formed on the trailer to permit storage of the ramps on the trailer.

It is therefore a general object of the present invention to provide an improved trailer for hauling small loads of vehicles.

Another object is to provide a vehicle hauling trailer which may be towed behind a pickup or other prime mover.

Still another object of the present invention is to provide a vehicle hauling trailer which is easy to load, has openings for tie-down access, and has a low wind drag during transport.

A further object is to provide an improved vehicle hauling trailer which is light weight, but capable of carrying three vehicles.

Still another object is to provide a vehicle hauling trailer which is economical to manufacture, simple to use, and refined in appearance.

These and other objects will be apparent to those skilled in the art.

BRIEF DESCRIPTION OF THE DRAWINGS

FIG. 3 is a sectional view taken at lines 3—3 in FIG. 1;

FIG. 4 is an elevational view of the rear of the trailer, with the axle assembly removed;

FIG. 5 is an enlarged perspective view of the rear of the trailer; and

FIG. 6 is a sectional view taken at lines 6—6 in FIG. 5.

DESCRIPTION OF THE PREFERRED EMBODIMENT

Figure 1:
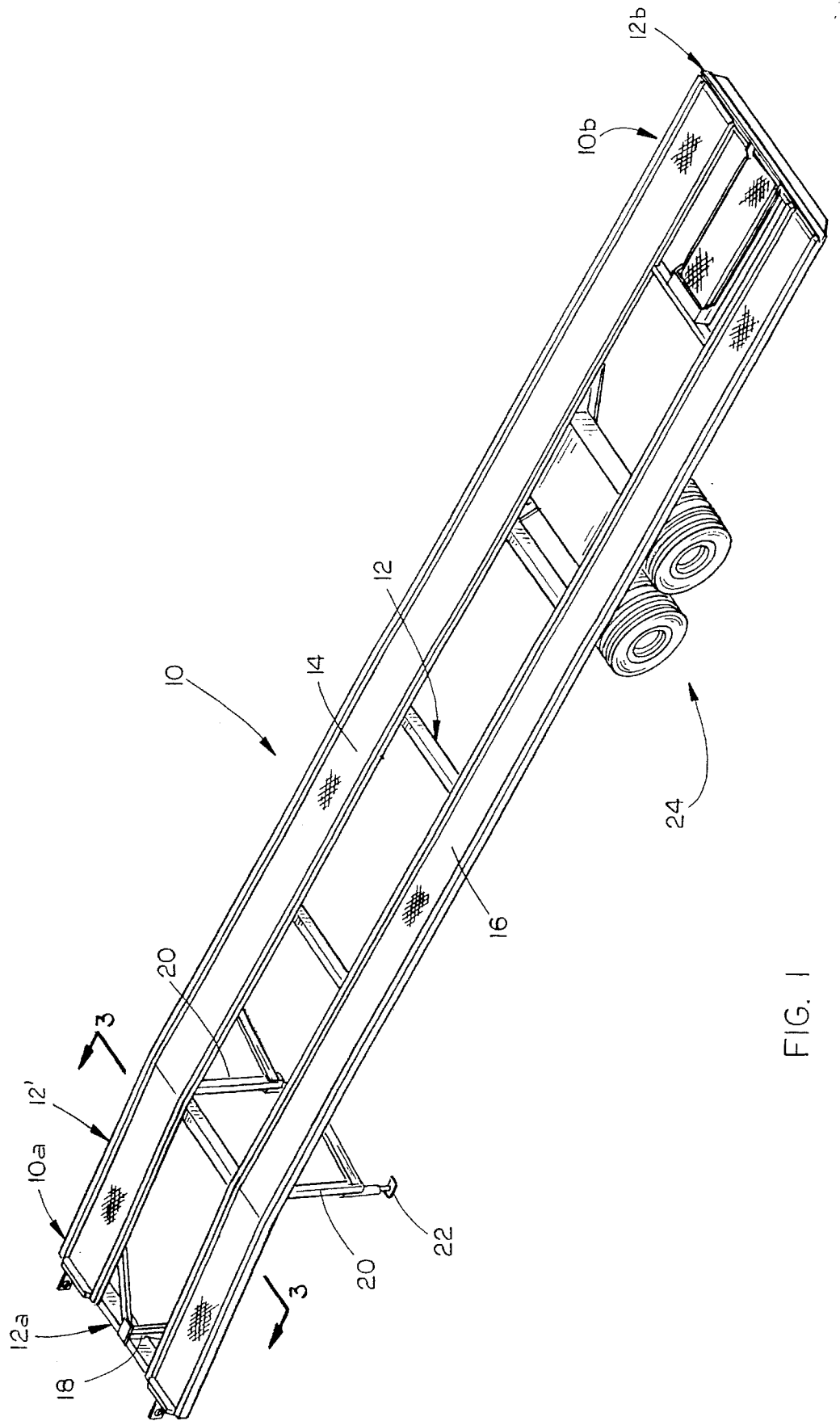
FIG. 1 is a perspective view of the trailer of the present invention.

Referring now to the drawings, in which similar or corresponding parts are identified with the same reference numeral, and more particularly to FIG. 1, the vehicle hauling trailer of the present invention is designated generally at 10.

Trailer 10 includes a support frame, designated generally at 12 with a pair of spaced apart, elongated tread plates 14 and 16 supported thereon and extending from the forward end 10a to the rearward end 10b of trailer 10. Tread plates 14 and 16 are spaced apart a distance to receive the wheels of a vehicle, to support and transport the vehicles on the trailer.

While not shown in detail, trailer 10 includes several conventional features found on other trailers, in various configurations. First, a goose neck 18 depends from the forward end 12a of support frame 12, and is connectable to any conventional goose neck type hitch. A pair of legs 20 project downwardly from support frame 12 rearwardly of the forward end 12a, and have a pair of retractable feet 22 for selectively supporting the front end of frame 12 above the ground, when detached from a towing vehicle. A wheel assembly 24 may be of any conventional type for supporting the weight of three vehicles. While a tandem axle wheel assembly 24 is shown, other assemblies could be utilized to support the frame 12.

Figure 2:
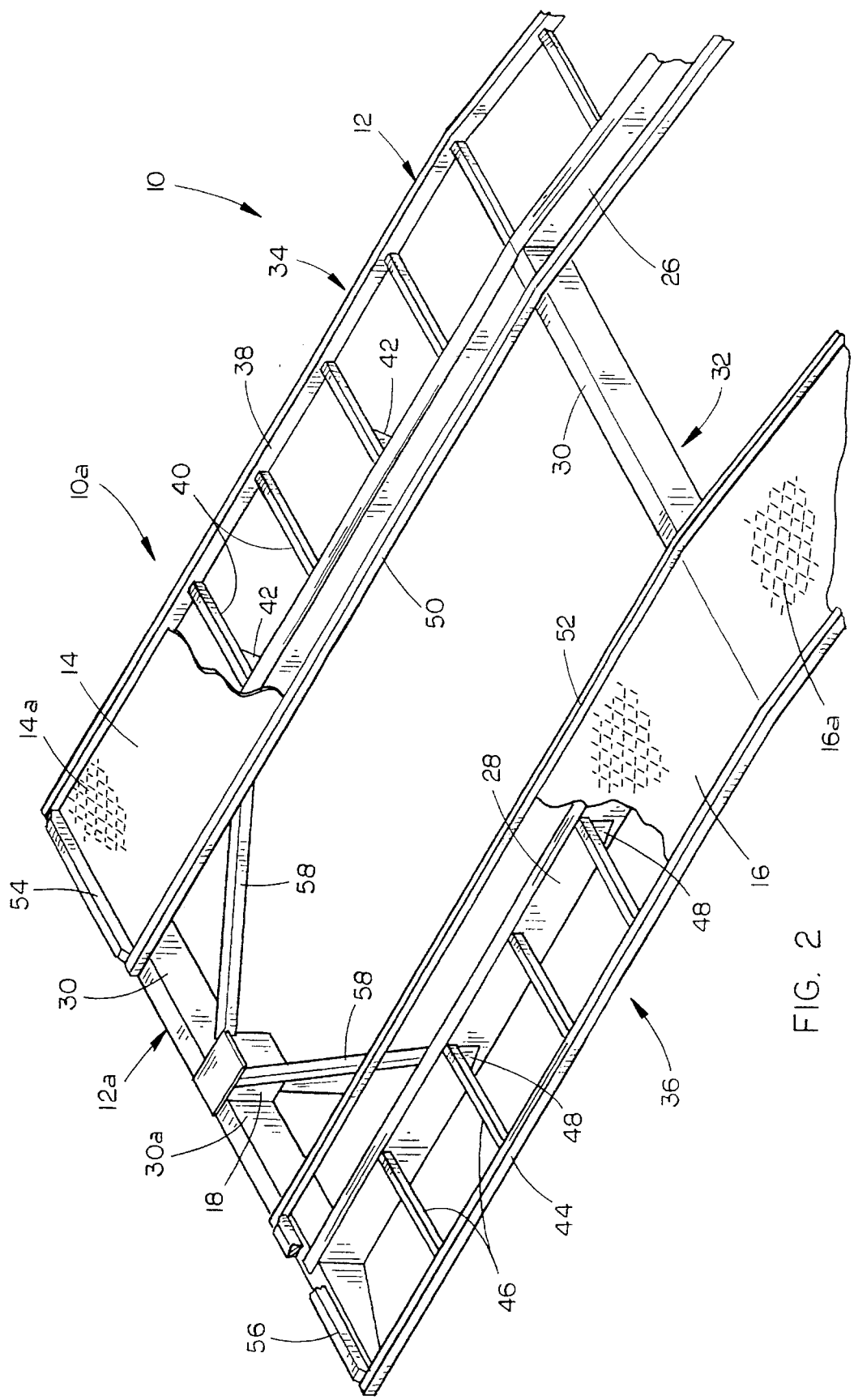
FIG. 2 is an enlarged perspective view of a portion of the trailer with portions broken away to view the support frame.

Referring now to FIGS. 2 and 3, support frame 12 includes a pair of elongated spaced apart tubular members 26 and 28, preferably formed of 4 inch by 10 inch steel tubing. A plurality of similarly dimensioned and shaped cross-members 30 interconnect tubular members 26 and 28 to form an open generally rectangular central frame designated generally at 32.

A pair of "ladder" frames 34 and 36 extend along the length of tubular members 26 and 28, and project outwardly therefrom. Ladder frame 34 includes a tubular rail 38 extending parallel along tubular member 26, and connected thereto by a plurality of spaced apart parallel rungs 40. A plurality of gusset plates 42 are affixed between tubular member 26 and alternating rungs 40, to assist in maintaining rungs 40 and ladder frame 34 oriented perpendicularly to tubular member 26. Similarly, ladder frame 36 includes a rail 44 extending parallel to tubular member 28, and connected thereto by spaced apart rungs 46 to project outwardly from tubular member 28. Gusset plates 48 are mounted between periodic rungs 46 and tubular member 28 to assist in supporting ladder frame 36.

As shown in FIG. 3, rails 38 and 44 are preferably dimensioned to project upwardly beyond the upper surfaces of tubular members 26 and 28, and rungs 40 and 46. A pair of inner rails 50 and 52 are mounted parallel to outer rails 38 and 44, and located inwardly of tubular members 26 and 28. Inner rails 50 and 52 extend from the forward end 12a to the rearward end 12b of support frame 12, to form an inner wall of a general channel shape with respect to outer rails 38 and 44, and the upper surfaces of rungs 40 and 46. Tread plates 14 and 16 are thereby received between inner and outer rails 50 and 38, and inner and outer rails 52 and 44, respectively, to form elongated support platforms upon which a vehicle may be supported.

As shown in FIG. 2, tread plates 14 and 16 preferably have a raised textured surface 14a and 16a respectively to provide traction to the wheels of vehicles supported thereon. A pair of elongated bars 54 and 56 are mounted between inner and outer rails 50 and 38, and inner and outer rails 52 and 44, at the forward end of ladder flames 34 and 36, to serve as tire stops for vehicles on tread plates 14 and 16.

As shown in FIG. 2, a pair of braces 58 project inwardly and forwardly from tubular members 26 and 28 and converge at their forward ends to support goose neck hitch 18, affixed generally centrally on forward cross-member 30a.

Referring once again to FIG. 1, central frame 12 is sloped at approximately 5° from the rearward end to the forward end, with a forward portion 12' bent to horizontal. In this way, three vehicles may be accommodated on a single level trailer. A flat trailer deck would either restrict the trailer to hauling two vehicles, or would require multiple decks to carry three vehicles.

Referring now to FIGS. 4, 5 and 6, the rearward end 10b of trailer 10 includes a pair of identical self-storing ramps 58, only one of which is shown in the drawings, for clarity. Each ramp 58 includes an elongated plate 60 with a textured upper surface 60a supported on a tubular frame work for rigidity. The forward end 58a of ramp 58 includes a forwardly and downwardly projecting lip 62 which slidably engages the upwardly projecting wall 64a of an angle 64 affixed to the upper end of the rearward surface of the rearward most cross-member 30b. Thus, lip 62 is slidable along angle 64, as shown by arrow 66, but will not slide rearwardly off the rearward end of trailer 10b unless lifted from angle 64. A hole 68 is formed through ramp 58 near the rearward end 58b to provide a handhold for pivoting the rearward end 58b upwardly about lip 62, to assist in sliding the ramp along angle 64.

A ramp storage area is formed between inner rails 50 and 52 and rearward cross-member 30b and intermediate cross-member 30c, as shown in FIGS. 5 and 6.

The ramp receiving pocket, designated generally at 70, includes a pair of parallel rails 72 and 74 extending between cross-members 30b and 30c, and each including a vertical wall 72a and 74a, and a horizontally inwardly projecting wall 72b and 74b respectively. Vertical walls 72a and 74a are spaced apart a distance slightly wider than the width of ramps 58, with horizontal walls 72b and 74b projecting inwardly, such that ramps 58 will be supported between horizontal walls 72b and 74b. A hood 76 projects rearwardly from cross-member 30c over the tops of vertical walls 72a and 74a, to receive ramps 58 thereunder. As shown in FIG. 6, rearward cross-member 30b preferably has a channel shape with the open portion of the channel directed transversely forwardly and aligned with the rearward ends of rails 72 and 74, to receive the rearward ends of ramps 58 therein. In this way, an upper transverse wall of rearward cross-member 30b prevents vertical movement of ramps 58, in a fashion similar to hood 76. The length of rails 72 and 74 is greater than the length of ramps 58, such that the ramps may be first positioned under hood 76, and lowered on to rails 72.

The ramps will then slide rearwardly under the transversely projecting upper wall of rearward end piece 30b, to maintain the ramps in position in pocket 70.

Whereas the invention has been shown and described in connection with the preferred embodiment thereof, many modifications, substitutions and additions may be made which are within the intended broad scope of the appended claims.

I claim:

1. A trailer for hauling vehicles, comprising:

a central frame having forward and rearward ends, including first and second elongated parallel longitudinal support members extending from the forward to the rearward end of the frame, and a plurality of transverse cross-members interconnecting the longitudinal members to form an open frame;

a first transverse frame affixed along an outward face of said first longitudinal member and projecting transversely outwardly therefrom;

a second transverse frame affixed along an outward face of the second longitudinal member and projecting transversely outwardly therefrom in a direction opposite the first transverse frame and generally coplanar with said first transverse frame;

a first tread plate supported on said first transverse frame and extending from a forward to a rearward end thereof;

a second tread plate supported on said second transverse frame and extending from a forward to a rearward end thereof;

said tread plates spaced transversely apart a pre-determined distance to support wheels of one of said vehicles thereon;

a wheel assembly mounted on said central frame having wheels in operable engagement with the ground to movably support the rearward end of the central frame above the ground; and a hitch on the forward end of the central frame for removably attaching the frame to a prime mover;

said first transverse frame including an outer rail extending parallel to the first longitudinal member and between the forward and rearward ends of the central frame, and a plurality of rungs connecting the outer rail to the first longitudinal member;

said first transverse frame rung having coplanar upper surfaces, with said first thread plate supported thereon;

said second transverse frame including an outer rail extending parallel to the second longitudinal member and between the forward and rearward ends of the central frame, and a second plurality of rungs connecting the second transverse frame outer rail to the second longitudinal member;

said second transverse frame rungs having coplanar upper surfaces, with said second tread plate supported thereon;

a first inner rail extending parallel to the first transverse frame outer rail and mounted on said central frame cross-members transversely and inwardly of the first longitudinal member;

said first longitudinal member having an upper surface generally coplanar with said first transverse frame rung upper surfaces;

said first transverse frame outer rail and first inner rail projecting upwardly beyond the plane of the upper surfaces of the first transverse frame rungs;

said first tread plate positioned between the first transverse frame outer rail and first inner rail, atop said first transverse frame rungs and first longitudinal member;

a second inner rail extending parallel to the second transverse frame outer rail and mounted on said central frame cross-members transversely inwardly of the second longitudinal member;

said second longitudinal member having an upper surface generally coplanar with said second transverse frame rung upper surfaces;

said second transverse frame outer rail and second inner rail projecting upwardly beyond the plane of the upper surfaces of the second transverse frame rungs;

said second tread plate positioned between the second transverse frame outer rail and second inner rail, atop the second transverse frame rungs and second longitudinal member.

2. The trailer of claim 1, further comprising:

first and second ramps removably connected at a forward end to the rearward end of said central frame and extending rearwardly therefrom to ground; and a pocket formed on said central frame for removably storing said ramps.

3. The trailer of claim 2, wherein said pocket includes:

first and second parallel rails extending forwardly from a rearward one of said cross-members of said central frame, and spaced-apart a distance to receive the ramps therebetween;

said first and second rails each including a generally horizontal wall projecting transversely inwardly towards one another to support said ramps thereon.

4. The trailer of claim 3, wherein said pocket further includes a hood extending over forward ends of said rails and projecting rearwardly a distance to prevent vertical movement of the forward ends of one of said ramps when stored on the rails.

5. The trailer of claim 4, further comprising:

a first plurality of gusset plates, each of said first plurality affixed between one of said rungs of the first transverse frame and the first longitudinal member; and a second plurality of gusset plates, each of said second plurality affixed between one of said rungs of the second transverse frame and the second longitudinal member.

6. The trailer of claim 1, wherein said longitudinal members are tubular members.

7. A trailer for hauling vehicles, comprising:

a central frame having forward and rearward ends, including first and second elongated parallel longitudinal support members extending from the forward to the rearward end of the frame, and a plurality of transverse cross-members interconnecting the longitudinal members to form an open frame;

a first transverse frame affixed along an outward face of said first longitudinal member and projecting transversely outwardly therefrom;

a second transverse frame affixed along an outward face of the second longitudinal member and projecting transversely outwardly therefrom in a direction opposite the first transverse frame and generally coplanar with said first transverse frame;

a first tread plate supported on said first transverse frame and extending from a forward to a rearward end thereof;

a second tread plate supported on said second transverse frame and extending from a forward to a rearward end thereof;

said tread plates spaced transversely apart a pre-determined distance to support wheels of one of said vehicles thereon;

a wheel assembly mounted on said central frame having wheels in operable engagement with the ground to movably support the rearward end of the central frame above the ground; and a hitch on the forward end of the central frame for removably attaching the frame to a prime mover;

first and second ramps removably connected at a forward end to the rearward end of said central frame and extending rearwardly therefrom to ground; and a pocket formed on said central frame for removably storing said ramps;

said pocket including:
first and second parallel rails extending forwardly from a rearward one of said cross-members of said central frame, and spaced-apart a distance to receive the ramps therebetween;
said first and second rails each including a generally horizontal wall projecting transversely inwardly towards one another to support said ramps thereon, and a hood extending over forward ends of said rails and projecting rearwardly a distance to prevent vertical movement of the forward ends of one of said ramps when stored on the rails;
a horizontal wall projecting forwardly from said rearward cross-member over rearward ends of said rails, to prevent vertical movement of the rearward ends of said ramps when stored on the rails; and
said rails respectively having a length greater than the length of a respective one of said ramps combined with the length of the horizontal wall projecting from the rearward cross-member.

8. The trailer of claim 7, further comprising:

an angle member affixed to a rearward most one of said cross-members of the central frame, with a first wall of the angle extending rearwardly from the rearward cross member, and a second wall of the angle projecting upwardly from the first wall of the angle, said angle extending transversely along said rearward cross-member; and wherein each said ramp includes a lip projecting forwardly and thence downwardly from the forward end of each ramp for engagement with the angle on said rearward cross-member.

* * * * *